United States Patent [19]
Smith

[11] 3,805,830
[45] Apr. 23, 1974

[54] MULTI-PASSAGE FLUID FLOW CONTROL SYSTEM
[75] Inventor: Bob L. Smith, Santa Cruz, Calif.
[73] Assignee: United States Surgical Corporation, Baltimore, Md.
[22] Filed: Feb. 22, 1972
[21] Appl. No.: 228,213

Related U.S. Application Data
[63] Continuation-in-part of Ser. No. 33,812, May 1, 1970, abandoned.

[52] U.S. Cl. .................................. 137/601, 251/9
[51] Int. Cl. ............................................ F16k 7/06
[58] Field of Search .......................... 128/214 R; 251/4–10; 137/601

[56]                References Cited
                UNITED STATES PATENTS
3,512,748   5/1970   Wilson .......................... 128/214 R
2,841,357   7/1958   Little .................................. 251/6
3,034,504   5/1962   Winsor et al. ..................... 251/9 X
3,316,936   5/1967   Gongwer ........................... 251/5 X FOREIGN PATENTS OR APPLICATIONS
1,306,369   9/1962   France ............................... 251/4
502,094     3/1939   Great Britain ....................... 251/7
901,925     7/1962   Great Britain ....................... 251/5
1,141,883   2/1969   Great Britain ....................... 251/9
1,358,478   3/1964   France ............................... 251/9

Primary Examiner—Martin P. Schwadron
Assistant Examiner—Richard Gerard
Attorney, Agent, or Firm—Fleit, Gipple & Jacobson

[57]                    ABSTRACT

A fluid control system for enabling rapid and accurate adjustment of intravenous flow to a predetermined desired flow rate within the standard intravenous flow range of from zero to 2,000 milliliters per hour and for maintaining a uniform and stable flow rate for each desired setting. The device includes a resilient deformable tubular element or multilumen through which the liquid may flow and a clamp mechanism for squeezing the tubular element to vary the flow rate. The tubular element has a plurality of axially extending fluid flow passages extending therethrough.

16 Claims, 8 Drawing Figures

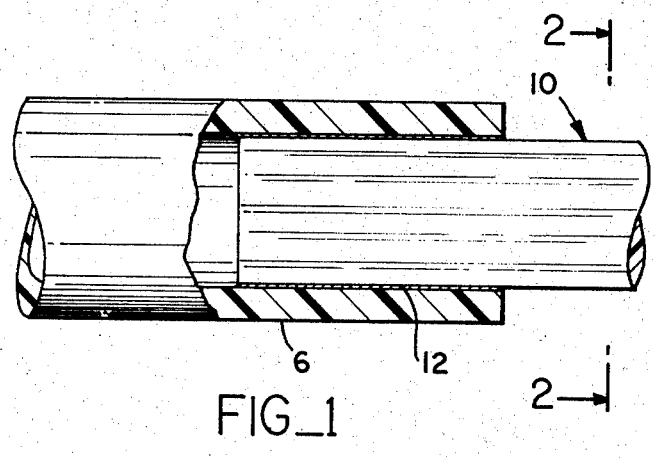
FIG_1
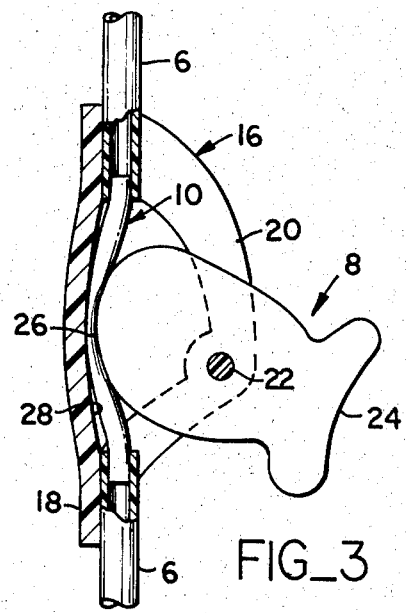
FIG_3
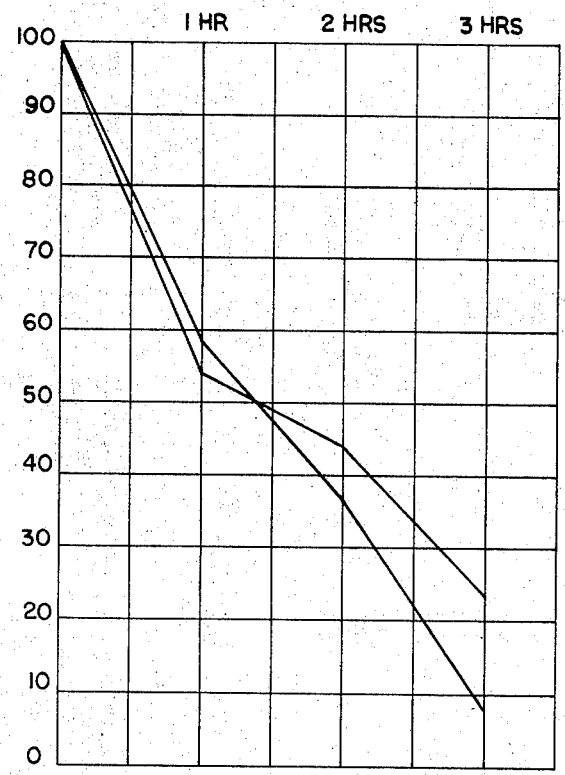
FIG_4
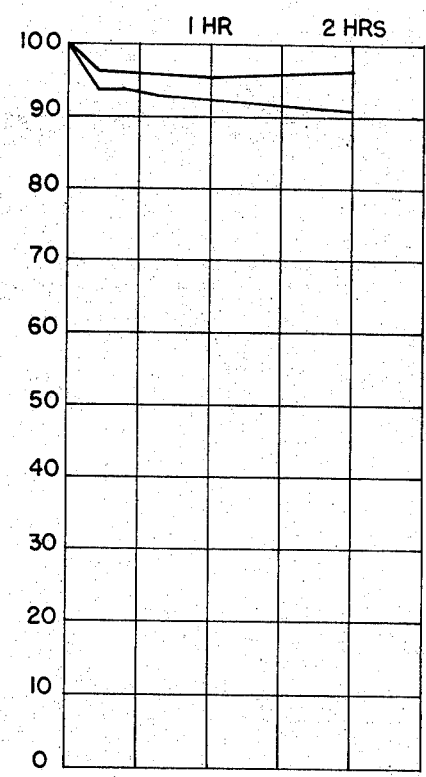
FIG_5
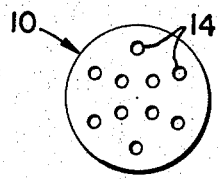
FIG_2

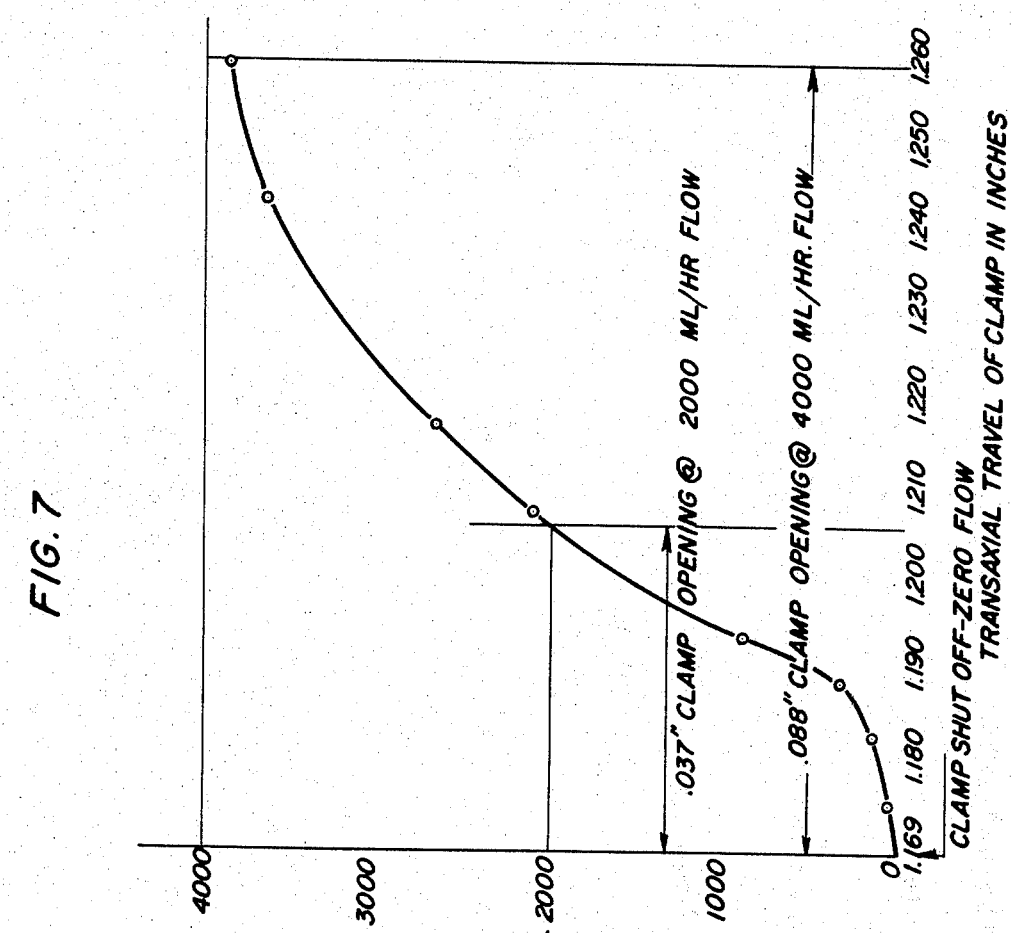

MULTI-PASSAGE FLUID FLOW CONTROL SYSTEM

This application is a continuation-in-part of application Ser. No. 33,812, filed May 1, 1970, for Multi-Passage Fluid Flow Control System and since abandoned.

BACKGROUND OF THE INVENTION

In numerous instances it is necessary or desirable that a fluid flow of some desired rate be established by clamping a flexible tube with a variable amount of pressure to thereby reduce the size of the flow passage and control the flow rate. By way of example, reference may be had to U. S. Pat. No. 3,034,504 in which a cam clamp engages a flexible tube for controlling an intravenous flow rate from a bottle to an injection needle. In place of the cam clamp, screw type clamps have been similarly used for the same purpose.

For reasons which are not too clearly defined, when a flexible tube is clamped or squeezed to a degree sufficient to provide an initial desired flow rate, such rate will undesirably decrease over a period of time, thus requiring continuous attention by a nurse or other attendant to change the clamp setting. Even with such attention, a desired uniform flow rate is difficult, if not impossible, to attain. It is believed that the cause of the diminished flow rate is due to a combination of cold flow of the material resulting from the clamping action and/or the capillary action of the fluid passing through the tube.

Experience has also shown that it is extremely difficult when using a conventional flexible tube having only a single passage therein, to quickly adjust the intravenous fluid flow to the desired flow rate. Because of the very high sensitivity of such an arrangement, very small adjustments to the clamp result in large changes in the fluid flow rate. Accordingly, it is difficult for the nurse or other attendant to quickly adjust the fluid flow to the desired rate.

Accordingly, an object of the present invention is to provide an intravenous fluid flow system which permits rapid and accurate adjustment to a predetermined desired flow rate within the standard intravenous flow range of from zero to 2,000 milliliters per hour and which maintains that flow rate at a substantially constant value during a predetermined and relatively long time period.

SUMMARY OF THE INVENTION

In accordance with the present invention, a clamp mechanism engages a portion of a modified portion of a flexible tube in such a manner that the flow rate, once established by the amount of clamping pressure, will remain substantially uniform and constant over extended periods of time. For example, by use of the system of this invention an intravenous flow rate can be maintained within 10 percent of a set rate after 1 hour. This is accomplished by providing a plurality of passages in such tube portion and separating the individual passages so that there is effectively provided a series of small tubes within a tube. Such passages are very small in cross-section particularly where the diameter of the main tube may be about one-eighth of an inch, and when the multi-passage tube is squeezed, the resulting flow rate with time is a desired uniform one and is preferably from zero to 2,000 milliliters per hour for intravenous applications.

DRAWINGS

FIG. 1 is a longitudinal view, primarily in cross-section, of a conventional tube with a section of the tube of the present invention attached thereto;

FIG. 2 is a transaxial cross-sectional view taken in the plane indicated by line 2—2 of FIG. 1;

FIG. 3 is a view of a flow system incorporating a clamp mechanism and the multi-passage tube of this invention;

FIG. 4 is a graph indicating the flow rate – time relationship of a conventional system;

FIG. 5 is a similar graph of the system of this invention;

FIG. 6 is a graph illustrating the undesirable high sensitivity of a conventional system;

FIG. 7 is a graph, similar to that illustrated in FIG. 6, showing the sensitivity of the system of this invention.

DESCRIPTION OF THE PREFERRED EMBODIMENT

Figure 8:
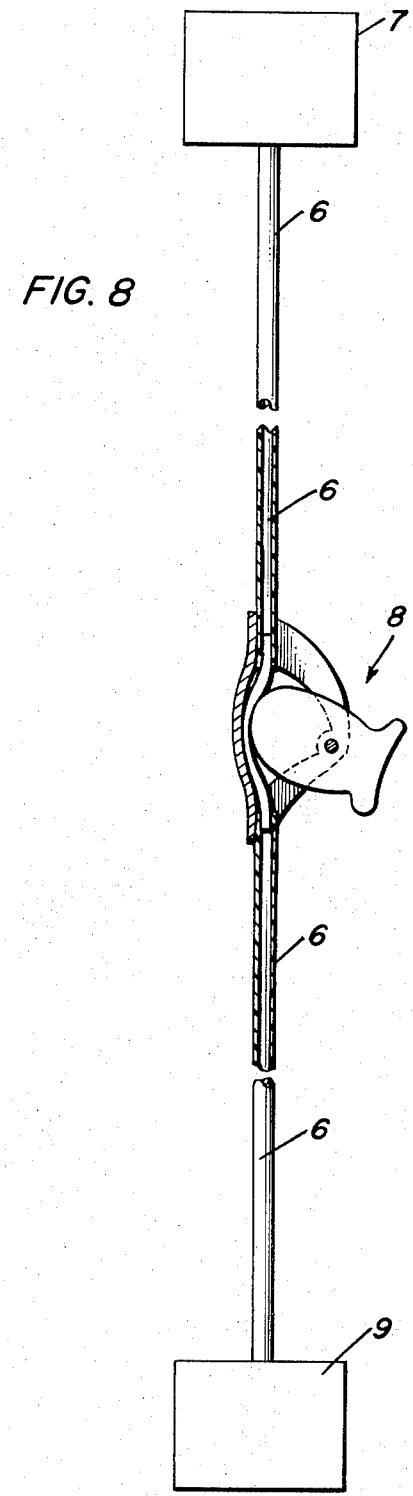
FIG. 8 is a view of an intravenous feeding system incorporating the inventive valve means and showing means for attaching an intravenous needle to the system and means for attaching the system to a supply of parenteral fluid.

As mentioned, it is common practice to utilize a clamp system for selectively squeezing the wall of a resilient tube to vary the flow rate therethrough. However, where a simple conventional tube is used, after the clamp is actuated to produce a given flow rate, such rate drastically diminishes over a period of time. With reference to FIG. 4 of the drawings, two tests are indicated in which a conventional system was employed to deliver a 5 percent dextrose in water solution. In both instances, the flow rate was initially set at 20 ml. per hour. At the end of the first hour, the rate dropped to between 50 and 60 percent of the original setting, at the end of the second hour to between 37 and 44 percent, and at the end of the third hour to between 8 and 24 percent. This obviously is not a desirable situation, particularly when dealing with the intravenous feeding of a patient.

In addition, where a simple conventional tube having a single passageway therein is used, the sensitivity of the system is extremely high. This makes it very difficult for the nurse or attendant to quickly set the desired intravenous flow rate.

With reference to FIG. 6 of the drawings, a graphical representation of the sensitivity of a known device is shown for delivering a normal saline solution without the use of an intravenous needle and wherein the solution was delivered to the atmosphere and not against a patient's blood pressure. A vinyl tube was used having an outside diameter of .131 inch and a single passageway extending therethrough having a diameter of .095 inch. Very small transaxial movement by the clamp results in large changes in the flow rate for this conventional arrangement. For example, movement of the clamp only .0055 inch results in a change of the flow rate from zero to 2,000 milliliters per hour. Movement of the clamp .011 inch results in a change in the flow rate from zero to 4,000 milliliters per hour. These minute movements of the clamp which result in such large changes in the flow rate make it extremely difficult for the attendant to initially adjust the flow rate to the desired amount.

By use of the present invention, however, the sensitivity of the system is significantly reduced, as illustrated in the graph of FIG. 7. FIG. 7 illustrates test results wherein a normal saline solution was used without an intravenous needle and wherein the flow was open to the atmosphere and was not introduced against a patient's blood pressure. Thus, the clamp must move .037 inch to change the flow rate from zero to 2,000 milliliters per hour. Similarly, the clamp must move .088 inch in order for the flow rate to change from zero to 4,000 milliliters per hour. This decreased sensitivity of the present system as compared with prior art arrangements makes it much easier for the attendant or the nurse to quickly adjust the intravenous flow to the desired rate.

With reference to FIGS. 1 to 3 of the drawings, a conventional tube 6 made of a resilient, flexible material, e.g. polyvinyl chloride, which has means 7 at its upper end for connection to a parenteral fluid bottle and means 9 at its lower end for connection to an intravenous needle, and which is normally used in connection with a clamping mechanism 8, is provided with a tubular section or multilumen 10 formed of a rubber or similar material. Section 10 is of cylindrical configuration and may be attached at each end to spaced tubes 6 by telescopically inserting end portions thereof into the tubes 6 and securing the same therein by means of a suitable adhesive layer 12 or by a friction fit.

Section 10, as best illustrated in FIGS. 1 and 2 of the drawings, is preferably of solid circular cross-section and is provided with a plurality, preferably five or more, of parallel passages 14 extending longitudinally completely through the section. The passages 14 are disposed substantially completely across the section with a relatively uniform spacing or pattern. Thus, for example, as liquid flows downwardly through the upper tube 6 shown in FIG. 3, the liquid will then pass through the passages 14, and emerge into the lower tube 6. In one embodiment of the invention, the combined cross-sectional area of the parallel passages 14 is less than the respective cross-sectional area of upper and lower tube 6. And, as indicated in FIG. 7, the combined cross-sectional area of the passages 14 may, if desired, be selected so that the maximum flow rate of solution through section 10 is about 4,000 milliliters per hour or less.

To selectively control the liquid flow rate, the clamping mechanism 8 is positioned in the system to be used in combination with the tubular section 10. As shown in FIG. 3, such mechanism includes a body 16 having a rear wall 18 positioned adjacent one side of the tubes and side walls 20 extending past the other sides of the tubes in a general manner as that shown in U.S. Pat. No. 3,034,504. Secured to the side walls by a pin or shaft 22 is a manually operable cam 24 whose cam surface 26 may be moved from an inoperative position spaced from the front side of the tubes to an operative clamping position as shown wherein the tube is squeezed between the rear wall 18 and the cam portion 26. As will be noted, the wall 18 is preferably longer than the section 10 so as to permit the clamp body to be adhesively secured to the main tubes 6 rather than to the section 10. It should also be noted that the wall 18 has a flat concave curvature 28 adjacent section 10 which provides for a greater surface area exposed to the clamping action upon cam actuation since a portion of the cam has a substantially complementary convex curvature.

The primary reason for securing the clamp body to the tube 6 rather than the section 10 is to avoid deviations in flow rate should one of the tubes 6 be pulled upon.

In any event, it will be appreciated that when the cam is actuated, a squeezing of the section 10 occurs, the degree of squeezing depending upon the cam position. Irrespective of the particular cam setting, the graphs shown in FIG. 5 should be of considerable interest. It will be recalled that in discussing the conventional flow rate of FIG. 4, an initial setting of 100 percent the desired flow rate dropped as low as 8 percent of such rate after 3 hours. With the arrangement shown in FIG. 2, similarly using a 5 percent dextrose in water solution, and an initial 20 ml/hour flow rate, there is substantially immediate reduction to about 94 to 97 percent of such rate, but after 2 hours, the flow rate of the two indicated tests remained at about 90 percent, or 18 ml/hour, significantly different from a flow rate of about 8 ml/hour in a conventional system.

Thus, the present invention provides for a fluid control system for enabling rapid and accurate adjustment of intravenous fluid flow to a predetermined desired flow rate and for maintaining that flow substantially constant during a predetermined and relatively extended time period. This system is especially adapted for the careful control required for intravenous feeding within the conventional intravenous flow rate range of from zero to 2,000 milliliters per hour. The flow rate may vary within this range depending upon the patient and the purpose of the intravenous feeding. For example, 1,500 milliliters per hour is representative of the rate used for anesthetics, 600 to 1,000 milliliters per hour when the flow is pumped and 350 milliliters per hour is a normal rate used for conventional intravenous feeding.

What is claimed is:

1. A fluid control system comprising: a first conduit for passing a fluid therethrough; a second conduit for passing fluid therethrough in spaced relation to said first conduit; attachment means for attaching an intravenous needle to said second conduit; a multilumen conduit having a plurality of parallel, longitudinally extending flow passages therein each of said flow passages being in fluid communication with said first and second conduits; and adjusting means in operative relationship with said multilumen conduit; said adjusting means comprising a compression clamp capable of transaxially compressing said multilumen conduit and further capable of varying the combined cross-sectional area of the flow passages in said multilumen conduit between a maximum and a minimum, said compression clamp having means thereon enabling manual setting of the extent of compression on said multilumen conduit, said compression clamp further capable of maintaining the extent of said compression on said multilumen conduit constant until manually reset; said apparatus further characterized in that said multilumen conduit and said adjusting means together form a valve which is suitably sized for controlling the flow rate of a parenteral fluid flowing through an intravenous feeding system.

2. A fluid control system as claimed in claim 1 wherein the size of said valve is so selected that said valve is capable of controlling the flow rate of said parenteral fluid within the standard intravenous feeding flow rate range of zero to 2,000 ml/hr.

3. A fluid control system as in claim 1 wherein said first and second conduits are made of a material such that if subjected to compression, the flow rate of fluid passing through said conduits would be non-constant with time.

4. A fluid control system as in claim 3 wherein said first and second conduits are made from a flexible vinyl material and further wherein said third conduit is made from a rubber or the like.

5. A fluid control system as in claim 4 wherein said first and second conduits are made from polyvinyl chloride.

6. A parenteral fluid feeding system comprising: a first flexible conduit for passing a parenteral fluid therethrough; means attached to said first conduit for fluidly connecting said first conduit to a supply of parenteral fluid; a second flexible conduit for passing parenteral fluid therethrough in spaced relation to said first flexible conduit; a multilumen conduit having a plurality of parallel, longitudinally extending flow passages therein, each of said flow passages being in fluid communication with said first and second conduits; and adjusting means in operative relationship with said multilumen conduit, said adjusting means comprising a compression clamp capable of transaxially compressing said multilumen conduit and further capable of varying the combined cross-sectional area of the flow passages in said multilumen conduit between a maximum and a minimum, said compression clamp having means thereon enabling manual setting of the extent of compression on said multilumen conduit, said compression clamp further capable of maintaining the extent of said compression on said multilumen conduit constant until manually reset; said apparatus further characterized in that said multilumen conduit and said adjusting means together form a valve suitable sized for controlling the flow rate of a parenteral fluid flowing through an intravenous feeding system.

7. A fluid control system as in claim 6 wherein the size of said valve is so selected that the valve is capable of controlling the flow rate of said parenteral fluid within the standard intravenous feeding flow rate range of zero to 2,000 milliliters per hour.

8. A fluid control system as in claim 6 wherein said first and second conduits are made of a material such that if subjected to compression, the flow rate of fluid passing through said conduits would be non-constant with time.

9. A fluid control system as in claim 8 wherein said first and second conduits are made from a flexible vinyl material and further wherein said multilumen conduit is made from a rubber or the like.

10. A fluid control system as in claim 9 wherein said first and second conduits are made from polyvinyl chloride and said multilumen conduit is made from a rubber.

11. An intravenous feeding system for transferring a parenteral solution from a parenteral solution reservoir to an intravenous needle for feeding the parenteral solution into a patient's body comprising: receiving means for fluidly connecting said system to a parenteral fluid reservoir; first flexible tubing fluidly attached to said receiving means and adapted to transport parenteral fluid flowing from said receiving means, said first flexible tubing characterized in that the flow rate of parenteral fluid flowing therethrough is nonuniform with time if compressed; a multilumen conduit section fluidly attached to said first flexible conduit, said multilumen conduit section having a plurality of longitudinally extending parallel flow passages therein, said multilumen conduit section made from a rubber or the like; second flexible tubing fluidly attached to said multilumen conduit section, said second flexible tubing characterized in that the flow rate of parenteral fluid flowing therethrough is nonuniform with time if compressed; attachment means connected to said second flexible tubing for fluidly connecting an intravenous needle to said second flexible tubing; and flow control means for controlling the flow rate of fluid flowing through said system, said flow control means having an opening therein defined on at least one side by compression throttle means, said multilumen conduit section axially passing through said opening such that said compression throttle means is capable of transaxially compressing said multilumen conduit section to thereby vary the combined cross sectional area of the flow passages therein between a maximum and a minimum, said apparatus further characterized in that the compression throttle means is capable of maintaining the extent of compression on said multilumen conduit constant until manually reset.

12. Apparatus according to claim 11 wherein said first flexible tubing and said second flexible tubing are made from a vinyl material.

13. Apparatus according to claim 12 wherein said first flexible tubing and said second flexible tubing are made from polyvinyl chloride, and further wherein said multilumen conduit is made from a rubber.

14. Apparatus according to claim 11 wherein each of the longitudinally extending passageways in said multilumen conduit section is in fluid communication with said first flexible tubing and with said second flexible tubing.

15. Apparatus according to claim 11 wherein adjacent ends of said first flexible tubing and said second flexible tubing are spaced apart by a small distance and coaxial, and further wherein said multilumen conduit section is positioned in said small space coaxially with said first flexible tubing and said second flexible tubing.

16. Apparatus according to claim 11 wherein said multilumen conduit section has a substantially uniform cross section and includes at least five longitudinally extending generally parallel passages therethrough, said multilumen conduit section being made from a rubber.

* * * * *